(12) United States Patent
Park (10) Patent No.: US 8,810,932 B2
(45) Date of Patent: Aug. 19, 2014

(54) IMAGING LENS SYSTEM

(75) Inventor: Young-woo Park, Changwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 13/540,839

(22) Filed: Jul. 3, 2012

(65) Prior Publication Data

US 2013/0208178 A1    Aug. 15, 2013

(30) Foreign Application Priority Data

Feb. 13, 2012   (KR) .......................... 10-2012-0014402

(51) Int. Cl.
*G02B 9/06*       (2006.01)
*G02B 9/04*       (2006.01)

(52) U.S. Cl.
CPC ........................................ *G02B 9/04* (2013.01)
USPC ........................................................ 359/794

(58) Field of Classification Search
CPC .............. G02B 9/04; G02B 9/06; G02B 9/08; G02B 9/12; G02B 9/34; G02B 9/60; G02B 6/62; G02B 6/64
USPC ................. 359/754–757, 759, 760, 763, 764, 359/767–769, 771, 772, 779, 780, 784, 359/791–794
See application file for complete search history.

(56) References Cited

U.S. PATENT DOCUMENTS

| | | | |
|---|---|---|---|
| 3,815,974 A * | 6/1974 | Momiyama | ................... 359/765 |
| 4,110,007 A | 8/1978 | Ikeda | |
| 4,165,916 A | 8/1979 | Nakamura | |
| 4,247,171 A | 1/1981 | Tsuji | |
| 4,396,256 A | 8/1983 | Fujie | |
| 5,293,270 A | 3/1994 | Hirano et al. | |
| 5,331,465 A * | 7/1994 | Miyano | ......................... 359/693 |
| 5,920,436 A | 7/1999 | Kitahara | |
| 2004/0264008 A1 | 12/2004 | Nishina | |
| 2005/0200977 A1 | 9/2005 | Tesar et al. | |
| 2007/0229983 A1 | 10/2007 | Saori | |
| 2011/0096416 A1* | 4/2011 | Obama | ......................... 359/793 |
| 2011/0115963 A1 | 5/2011 | Sueyoshi | |

FOREIGN PATENT DOCUMENTS

| | | |
|---|---|---|
| JP | 06-242370 A | 9/1994 |
| JP | 2007-086308 A | 4/2007 |
| JP | 2007-225960 A | 9/2007 |
| JP | 2008-032921 A | 2/2008 |

(Continued)

OTHER PUBLICATIONS

Search Report established for EP 13152984.4 (Apr. 26, 2013).

*Primary Examiner* — Darryl J Collins
(74) *Attorney, Agent, or Firm* — Drinker Biddle & Reath LLP (57) ABSTRACT

An imaging lens system includes a first lens group having a positive refractive power and a second lens group having a positive refractive power, the first lens group and the second lens group are sequentially arranged from an object side to an image surface. The first lens group includes a first lens having a positive refractive power, a second lens having a positive refractive power, and a third lens having a negative refractive power and having a concave surface toward the image surface, which are sequentially arranged from the object side to the image surface. The second lens group includes a cemented lens of a fourth lens that has a concave surface toward the object side and is a negative lens and a fifth lens that is a positive lens, which are sequentially arranged from the object to the image surface.

18 Claims, 8 Drawing Sheets

(56) References Cited

FOREIGN PATENT DOCUMENTS

| | | |
|---|---|---|
| JP | 2009-186791 A | 8/2009 |
| JP | 2009-192996 A | 8/2009 |
| JP | 2009-258157 A | 11/2009 |
| JP | 2009-258158 A | 11/2009 |
| JP | 2009-258160 A | 11/2009 |
| JP | 2010-072390 A | 4/2010 |

* cited by examiner

IMAGING LENS SYSTEM

CROSS-REFERENCE TO RELATED PATENT APPLICATION

This application claims the benefit of Korean Patent Application No. 10-2012-0014402, filed on Feb. 13, 2012, in the Korean Intellectual Property Office, the disclosure of which is incorporated herein in its entirety by reference.

BACKGROUND

1. Field

The invention relates to an imaging lens system that is suitable for a photographing apparatus employing a high-definition image sensing device.

2. Description of the Related Art

Recently, digital cameras or video cameras, including a solid-state image sensing device, such as a charge-coupled device (CCD) or a complementary metal-oxide semiconductor (CMOS), are widely distributed. Also, the increasing number of pixels of an image sensing device has led to a demand for small imaging optical systems that have excellent optical performance and consist of a small number of lenses.

As an interchangeable lens-type optical imaging system having a viewing angle of 20° to 30°, a Gauss-type optical imaging system that has a symmetrical structure about its iris is known. In the Gauss-type optical imaging system, lenses are arranged generally symmetrical about an iris. Due to the symmetry characteristic, it is known that the Gauss-type imaging optical system has an excellent aberration correction capability.

A single-lens reflex type camera and a digital camera require a space for the arrangement of mirrors or filters in front of a light-receiving unit, such as a CCD or a CMOS. Accordingly, an optical imaging system used in these cameras needs to have a sufficient back focal length.

Imaging lens systems that have the Gauss-type symmetry characteristic and a sufficient back focal length have been suggested, and in such imaging lens systems, negative lenses are arranged symmetrical about an iris, and a positive lens is arranged outside each of the negative lenses, thereby securing a back focal length. However, there is more need for a design for reducing the number of lenses and appropriately correcting aberration for miniaturization and improvement of optical performance.

SUMMARY

An embodiment of the invention provides an imaging lens system that is small and appropriately corrects aberration.

According to an embodiment of the invention, there is provided an imaging lens system including: a first lens group having a positive refractive power and includes a first lens having a positive refractive power, a second lens having a positive refractive power, and a third lens having a negative refractive power and having a concave surface toward the image surface, which are sequentially arranged from an object to the image surface; and a second lens group having a positive refractive power which includes a cemented lens in which a fourth lens that has a concave surface toward the object side and is a negative lens and a fifth lens that is a positive lens are bonded to each other, the fourth lens and the fifth lens are sequentially arranged from the object side to the image surface, wherein the first lens group and the second lens group are sequentially arranged from the object side to the image surface.

The imaging lens system may satisfy the following condition:

$$0.2 \leq fB/f \leq 0.7$$

wherein fB is the air distance along the optical axis between the lens surface of the second lens group which is closest surface to the image surface and the image surface and f is the focal length of the imaging lens system.

The imaging lens system may satisfy the following condition:

$$0.8 \leq L_T/f \leq 1.3$$

wherein $L_T$ is the distance along the optical axis between the closest lens surface to the object side of the first lens group and the image surface, and f is the focal length of the imaging lens system.

An iris may be disposed between the first lens group and the second lens group.

The imaging lens system may satisfy the following condition:

$$|n_{d(p)} - n_{d(n)}| \geq 0.1,$$

wherein $n_{d(p)}$ is a refractive index of d-line (587.56 nm) of the positive lens of the second lens group and $n_{d(n)}$ is a refractive index of d-line (587.56 nm) of the negative lens of the second lens group.

The second lens group may include at least one aspherical surface, and a lens surface of the second lens group which is closest to the object side is an aspherical surface.

The second lens group may include at least one aspherical surface.

When the location of the object is changed from infinity to near position, focusing may be performed by moving the whole imaging lens system toward the object.

BRIEF DESCRIPTION OF THE DRAWINGS

The above and other features and advantages will become more apparent from the following detailed description of exemplary embodiments with reference to the attached drawings in which.

DETAILED DESCRIPTION

As used herein, the term "and/or" includes any and all combinations of one or more of the associated listed items.

Expressions such as "at least one of," when preceding a list of elements, modify the entire list of elements and do not modify the individual elements of the list.

Hereinafter, imaging lens systems according to one or more embodiments of the invention are described below with reference to the attached drawings.

FIGS. 1, 3, 5, and 7 are views illustrating optical arrangements of imaging lens systems according to first through fourth embodiments, respectively.

Referring to the drawings, an imaging lens system includes a first lens group G1 having a positive refractive power and a second lens group G2 having a positive refractive power, which are sequentially arranged in a direction from an object side OBJ to an image surface IMG. An iris ST may be arranged between the first lens group G1 and the second lens group G2. On the image surface IMG, an image sensing device (not shown), such as a charge-coupled device (CCD) or complementary metal-oxide semiconductor (CMOS), may be disposed. An infrared filter 60 may be disposed between the second lens group G2 and the image surface IMG.

The imaging lens systems according to embodiments of the invention are unifocal optical systems embodying a viewing angle of about 20° to 30°, and have a relatively simplified structure enabling focusing. In the imaging lens systems, the refractive power difference of the lenses arranged on opposite sides of the iris ST is optimized to maintain the symmetry characteristic and secure a back focal length.

The first lens group G1 includes a positive lens, another positive lens, and a negative lens, which are sequentially arranged from the object side OBJ, and the second lens group G2 includes a negative lens and a positive lens, which are sequentially arranged from the object side OBJ. With the compact structure using 5 lenses, when the location of the object OBJ is changed from infinity to near position, focusing is performed by moving all lenses toward the object side OBJ. When focusing is performed using all lenses, even during a near-distance focusing, a change in the curvature of the image field is small, thereby preventing a decrease in the optical performance.

Also, the first lens group G1 having a positive refractive power is arranged in front of the iris ST, thereby enabling off-axis light to be effectively corrected, and a lens surface that is closest to the iris from among the lenses of the first lens group G1 has a strong negative refractive power so as to remove spherical aberration occurring from the positive refractive power. Also, the positive lens which is the second lens of the first lens group G1 and the negative lens which is the third lens of the third lens of the first lens group are bonded to each other to form a cemented lens. Accordingly, chromatic aberration is easily corrected.

The second lens group G2 is constructed as a cemented lens in which a negative lens and a positive lens are bonded to each other to appropriately correct an axial chromatic aberration. A surface of the negative lens of the second lens group G2 which is closest to the object side OBJ is concave, and also, this surface may be aspherical. Due to the aspherical surface, spherical aberration may be appropriately corrected and simultaneously, an occurrence of Saggital Coma may be suppressed. Also, the air interval between the negative lens and the positive lens of the second lens group G2 may likely cause a process error, and by using a cemented lens structure, the error factor is removed.

The first lens group G1 is almost symmetric to the second lens group G2 about the iris ST. This structure is suitable for correction of off-axis aberration and compactness of an optical system.

The imaging lens systems may satisfy the following condition:

$$0.2 \leq fB/f \leq 0.7 \quad (1)$$

wherein f is the focal length of the imaging lens systems and fB is the back focal length of the imaging lens systems, that is, the air distance between the lens surface of the second lens group G2 which is the closest surface to the image surface IMG, and the image surface IMG.

Condition (1) defines the ratio of the back focal length to the total focal length. If the ratio is less than the lower limit, the back focal length may be too small, and if the ratio is greater than the upper limit, the back focal length may be too long, and thus, the distance between a light incident surface of the imaging lens systems and the image surface IMG is too long and it may be difficult to make the imaging lens systems compact.

Also, the imaging lens systems may satisfy the following condition.

$$0.8 \leq L_T/f \leq 1.3 \quad (2)$$

wherein $L_T$ is the distance along the optical axis between the closest lens surface to the object side OBJ of first lens group G1 and the image surface IMG, and f is the total focal length.

Condition (2) defines the ratio of the total length of the imaging lens system to the focal length. If the ratio is less than the lower limit, refractive power of the first lens group G1 is decreased and thus, the symmetry characteristic about the iris ST may not be maintained and the imaging lens system may be too small so that it is difficult to obtain excellent optical performance. If the ratio is greater than the upper limit, refractive power of the second lens group G2 is decreased and thus, the symmetry characteristic about the iris ST may not be maintained and the total length of the imaging lens system will be too long to prove a compact imaging lens system.

Also, the imaging lens systems may satisfy the following condition.

$$|n_{d(p)} - n_{d(n)}| \geq 0.1 \quad (3)$$

wherein, $n_{d(p)}$ and $n_{d(n)}$ respectively denote a refractive index of d-line (587.56 nm) of the positive lens of the second lens group G2 which is closest to the image surface IMG and a refractive index of d-line (587.56 nm) of the negative lens of the second lens group G2.

Condition (3) defines a refractive index difference range of the negative lens and the positive lens of the second lens group G2. If the difference is less than 0.1, an Abbe number difference of the negative lens and the positive lens is small, and thus, it is difficult to correct longitudinal chromatic aberration and magnification chromatic aberration and, as a result, excellent imaging performance may not be maintained.

Hereinafter, lens data according to various embodiments is described below. In regard to the lens data, f is the total focal length, Fno is an F number, and w is a half view angle. fB (in air) is the back focal length, and a variable distance due to focusing is indicated by D0 and D1. Also, RDY is a radius of curvature, THI is the distance between lenses or a lens thickness, nd is a refractive index, and, vd is an Abbe number.

ASP is an aspherical surface, which is defined as follows:

$$x = \frac{cy^2}{1 + \sqrt{1-(K+1)c^2h^2}} + Ah^4 + Bh^6 + Ch^8 + Dh^{10} \quad \text{[Equation 1]}$$

wherein x is the distance from the vertex of a lens along an optical axis, y is the distance from the vertex of the lens in a direction perpendicular to the optical axis, K is a conic constant, A, B, C, and D are aspherical coefficients, and c is a reciprocal (1/R) of the radius of curvature of the vertex of a lens.

First Embodiment

Figure 1:
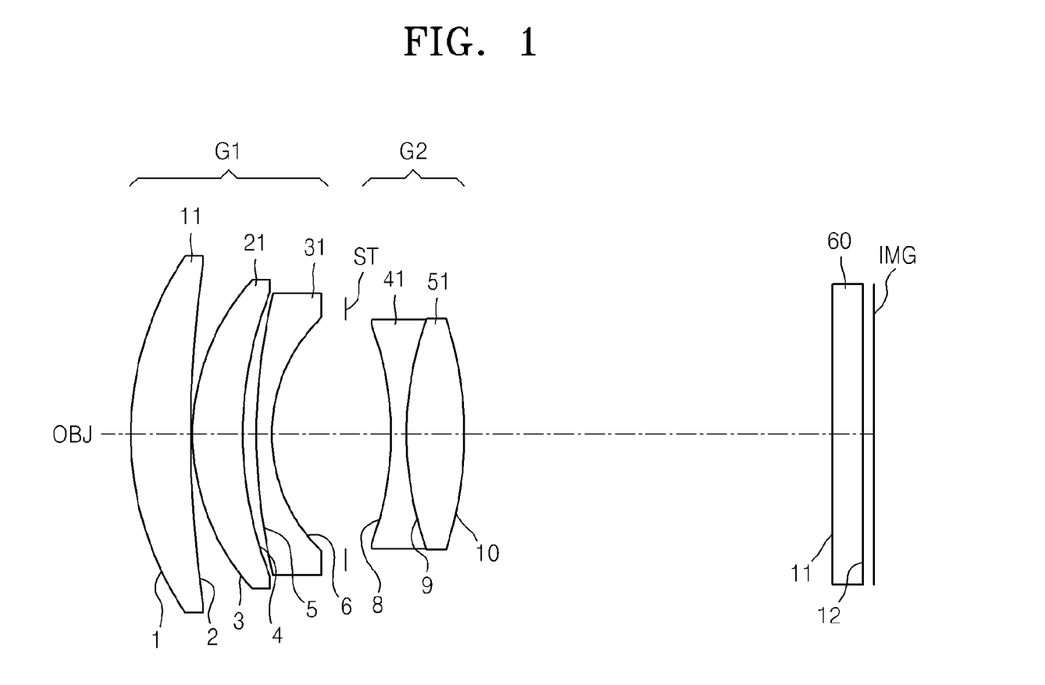
FIG. 1 illustrates an optical arrangement of an imaging lens system according to a first embodiment.

FIG. 1 illustrates an optical arrangement of an imaging lens system according to a first embodiment. The imaging lens system includes a first lens group G1 having a positive refractive power, an iris ST, and a second lens group G2 having a positive refractive power, which are sequentially arranged from an object side OBJ to an image surface IMG. The first lens group G1 includes a first lens 11 which is a positive lens, a second lens 21 which is a positive lens, and a third lens 31 which has a concave surface toward the image surface IMG and is a negative lens. The second lens group G2 includes a fourth lens 41 which has a concave surface toward the object side OBJ and is a negative lens, and a fifth lens 51 which is a positive lens. The fourth lens 41 and the fifth lens 51 form a cemented lens.

Lens data of the imaging lens system according to the first embodiment is as follows:

| f; 69.5 | Fno; 2.04 | 2ω; 23.0° | | |
|---|---|---|---|---|
| | RDY | THI | nd | ud |
| OBJ: | INFINITY | D0 | | |
| 1: | 30.00000 | 5.880000 | 1.71300 | 53.94 |
| 2: | 113.80000 | 0.150000 | | |
| 3: | 21.48000 | 4.900000 | 1.69680 | 55.46 |
| 4: | 35.37000 | 1.525000 | | |
| 5: | 57.80000 | 1.500000 | 1.75520 | 27.53 |
| 6: | 15.57000 | 7.280000 | | |
| ST: | INFINITY | 4.455000 | | |
| 8: | −31.20000 | 1.500000 | 1.51424 | 63.90 |
| ASP: | | | | |

K: 0.000000
A: −.101711E−04   B: 0.000000E+00   C: 0.000000E+00
D: 0.000000E+00

| 9: | 31.87000 | 5.800000 | 1.69680 | 55.46 |
|---|---|---|---|---|
| 10: | −32.98000 | D1 | | |
| 11: | INFINITY | 3.000000 | 1.51680 | 64.20 |
| 12: | INFINITY | 1.000000 | | |

| IMG: INFINITY | | |
|---|---|---|
| | Infinity | Nearest |
| Photographing magnification | 0 | −0.1X |
| D0 | Infinity | 759.49155 |
| D1 | 38.03321 | 44.98344 |
| fB (In Air) | 41.01106 | 47.96129 |

Figure 2:
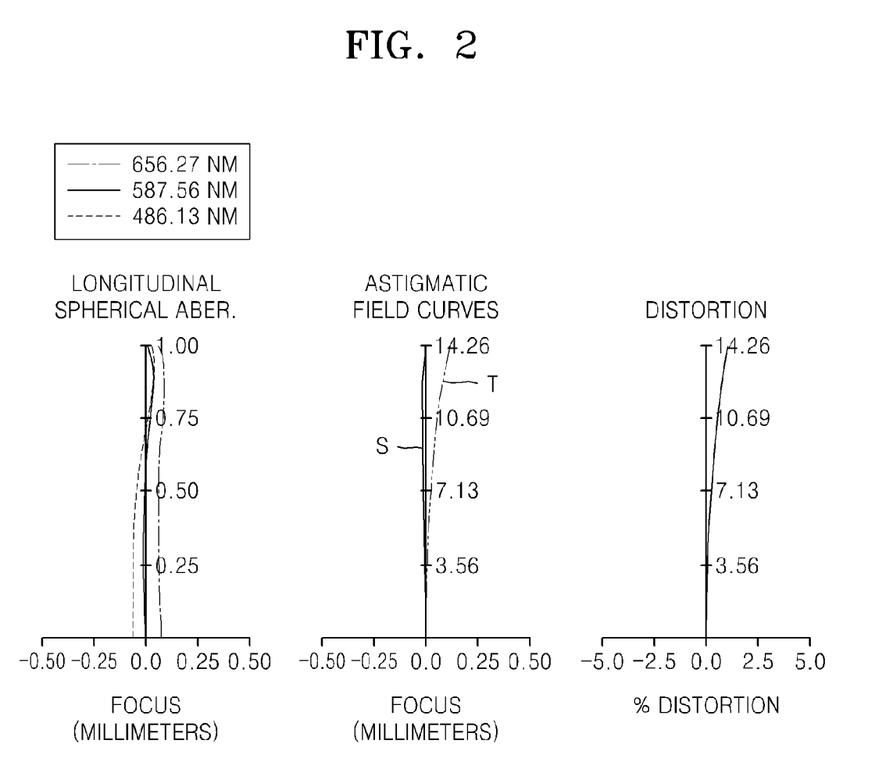
FIG. 2 is an aberration diagram showing the longitudinal spherical aberration, astigmatic field curves, and distortion of the imaging lens system according to the first embodiment illustrated in FIG. 1.

FIG. 2 is an aberration diagram showing the longitudinal spherical aberration, astigmatic field curves, and distortion of the imaging lens system according to the first embodiment. Longitudinal spherical aberrations with respect to light having a wavelength of 656.27 (nm), 587.56 (nm), and 486.13 (nm) are shown, and the astigmatic field curves and the distortion with respect to light having a wavelength of 587.56 (nm) are shown. The astigmatic field curves are a tangential field curvature (T) and a sagittal field curvature (S).

Second Embodiment

Figure 3:
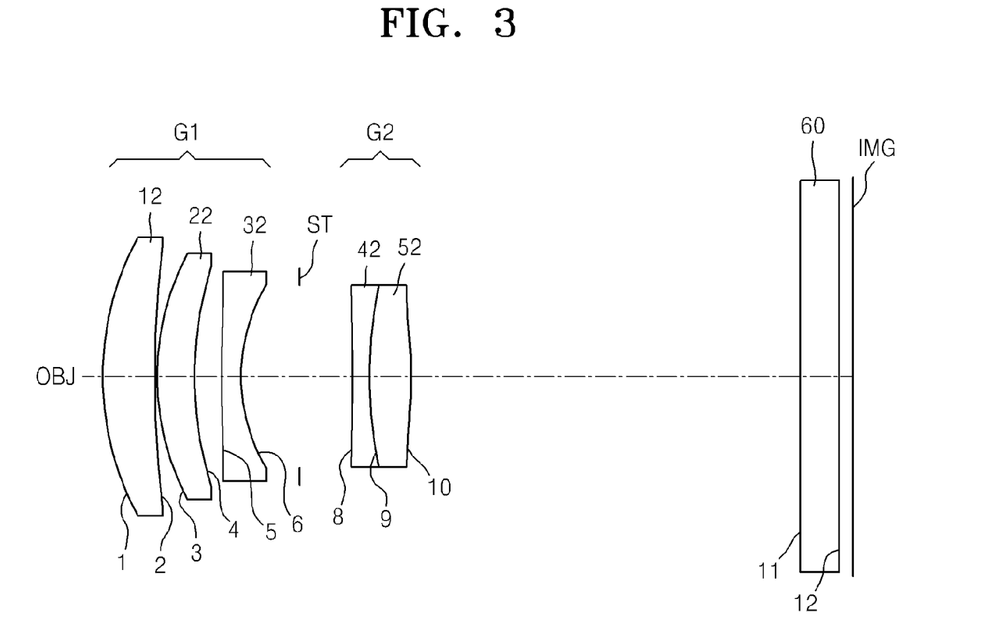
FIG. 3 illustrates an optical arrangement of an imaging lens system according to a second embodiment.

FIG. 3 illustrates an optical arrangement of an imaging lens system according to a second embodiment. The imaging lens system includes a first lens group G1 having a positive refractive power, an iris ST, and a second lens group G2 having a positive refractive power, which are sequentially arranged from an object side OBJ to an image surface IMG. The first lens group G1 includes a first lens 12 which is a positive lens, a second lens 22 which is a positive lens, and a third lens 32 which has a concave surface toward the image surface IMG and is a negative lens. The second lens group G2 includes a fourth lens 42 which has a concave surface toward the object side OBJ and is a negative lens, and a fifth lens 52 which is a positive lens. The fourth lens 42 and the fifth lens 52 form a cemented lens.

Lens data of the imaging lens system according to the second embodiment is as follows:

| f; 54.51 | Fno; 2.83 | 2ω; 29.1° | | |
|---|---|---|---|---|
| | RDY | THI | nd | ud |
| OBJ: | INFINITY | D0 | | |
| 1: | 20.52000 | 3.900000 | 1.77250 | 49.62 |
| 2: | 90.72000 | 0.150000 | | |
| 3: | 18.60000 | 2.800000 | 1.59282 | 68.63 |
| 4: | 26.65000 | 2.010000 | | |
| 5: | 180.20000 | 1.500000 | 1.74077 | 27.76 |
| 6: | 13.22000 | 4.290000 | | |
| ST: | INFINITY | 4.060000 | | |
| 8: | −159.00000 | 1.200000 | 1.51680 | 64.20 |
| 9: | 29.32000 | 3.090000 | 1.80420 | 46.50 |
| 10: | −56.95000 | D1 | | |
| 11: | INFINITY | 2.940000 | 1.51680 | 64.20 |
| 12: | INFINITY | 1.000000 | | |
| IMG: | INFINITY | | | |

| | Infinity | Nearest |
|---|---|---|
| Photographing magnification | 0 | −0.1X |
| D0 | Infinity | 597.15259 |
| D1 | 31.17863 | 36.62984 |
| fB (In Air) | 34.11692 | 39.56813 |

Figure 4:
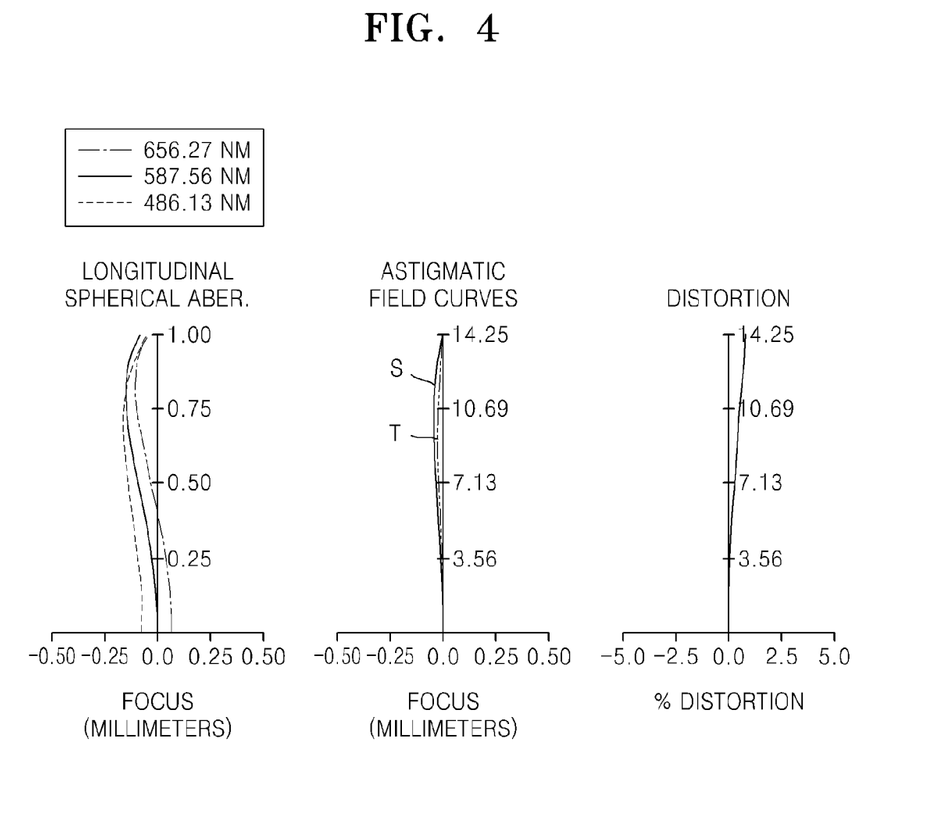
FIG. 4 is an aberration diagram showing the longitudinal spherical aberration, astigmatic field curves, and distortion of the imaging lens system according to the second embodiment illustrated in FIG. 3.

FIG. 4 is an aberration diagram showing the longitudinal spherical aberration, astigmatic field curves, and distortion of the imaging lens system according to the second embodiment.

Third Embodiment

Figure 5:
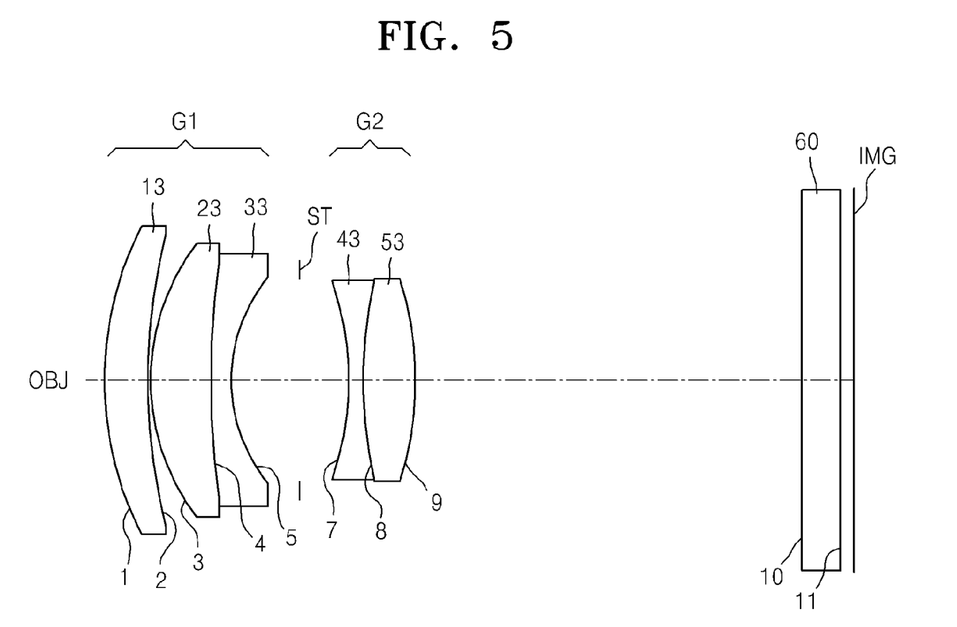
FIG. 5 illustrates an optical arrangement of an imaging lens system according to a third embodiment.

FIG. 5 illustrates an optical arrangement of an imaging lens system according to a third embodiment. The imaging lens system includes a first lens group G1 having a positive refractive power, an iris ST, and a second lens group G2 having a positive refractive power, which are sequentially arranged from an object side OBJ to an image surface IMG. The first lens group G1 includes a first lens 13 which is a positive lens, a second lens 23 which is a positive lens, and a third lens 33 which has a concave surface toward the image surface IMG and is a negative lens. The second lens 23 and the third lens 33 form a cemented lens in which the second lens 23 and the third lens 33 are bonded to each other. The second lens group G2 includes a fourth lens 43 which has a concave surface toward the object side OBJ and is a negative lens, and a fifth lens 53 which is a positive lens. The fourth lens 43 and the fifth lens 53 form a cemented lens.

Lens data of the imaging lens system according to the third embodiment is as follows:

| f; 54.54 | Fno; 2.47 | 2ω; 29.1° | | |
|---|---|---|---|---|
| | RDY | THI | nd | ud |
| OBJ: | INFINITY | D0 | | |
| 1: | 24.22000 | 3.400000 | 1.91082 | 52.50 |
| 2: | 46.60000 | 0.150000 | | |

-continued

| 3:   | 16.28000      | 4.730000   | 1.59282      | 68.63 |
| 4:   | 70.30000      | 1.500000   | 1.76182      | 26.61 |
| 5:   | 12.17000      | 5.300000   |              |       |
| ST:  | INFINITY      | 3.800000   |              |       |
| 7:   | −21.50000     | 1.200000   | 1.51424      | 63.90 |
| ASP: |               |            |              |       |

| K: | 0.000000 | | |
|---|---|---|---|
| A: | :−.182245E−04 | B: | :0.000000E+00 |
| C: | :0.000000E+00 | D: | :0.000000E+00 |
| 8: | 34.26000 | 3.920000 | 1.77250 | 49.62 |
| 9: | −26.09000 | D1 | | |
| 10: | INFINITY | 2.940000 | 1.51680 | 64.20 |
| 11: | INFINITY | 1.000000 | | |
| IMG: | INFINITY | | | |

|  | Infinity | Nearest |
|---|---|---|
| Photographing magnification | 0 | −0.1X |
| D0 | Infinity | 595.48442 |
| D1 | 32.11969 | 37.57354 |
| fB (In Air) | 35.05798 | 40.51183 |

Figure 6:
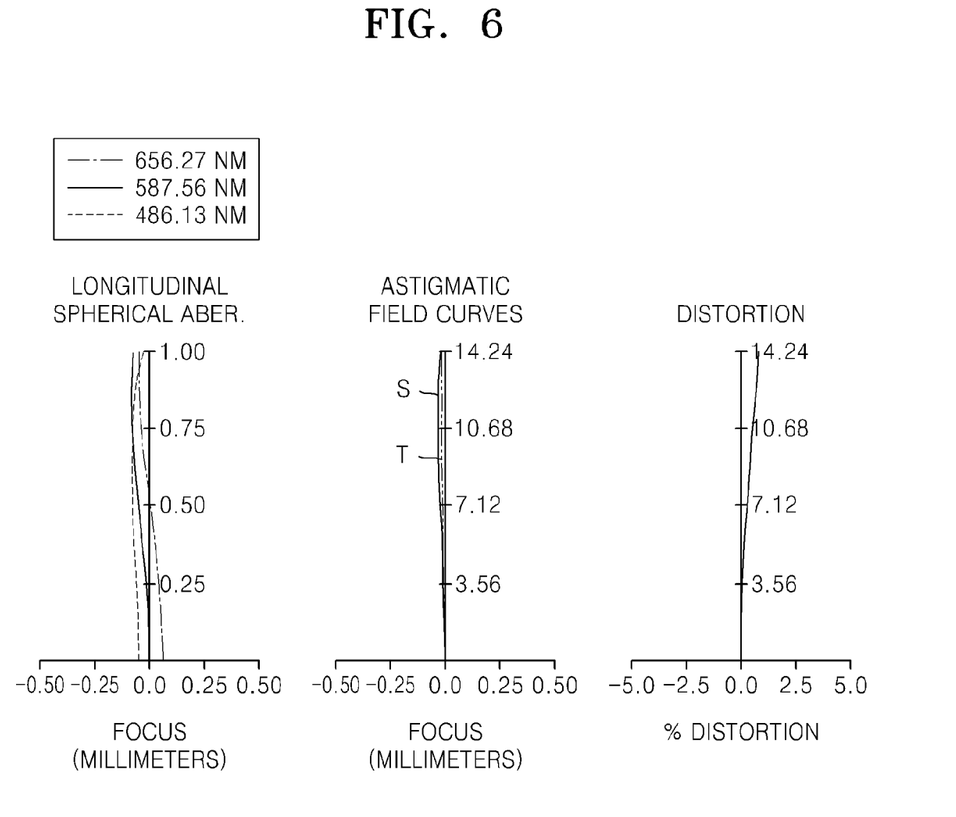
FIG. 6 is an aberration diagram showing the longitudinal spherical aberration, astigmatic field curves, and distortion of the imaging lens system according to the third embodiment illustrated in FIG. 5.

FIG. 6 is an aberration diagram showing the longitudinal spherical aberration, astigmatic field curves, and distortion of the imaging lens system according to the third embodiment.

Fourth Embodiment

Figure 7:
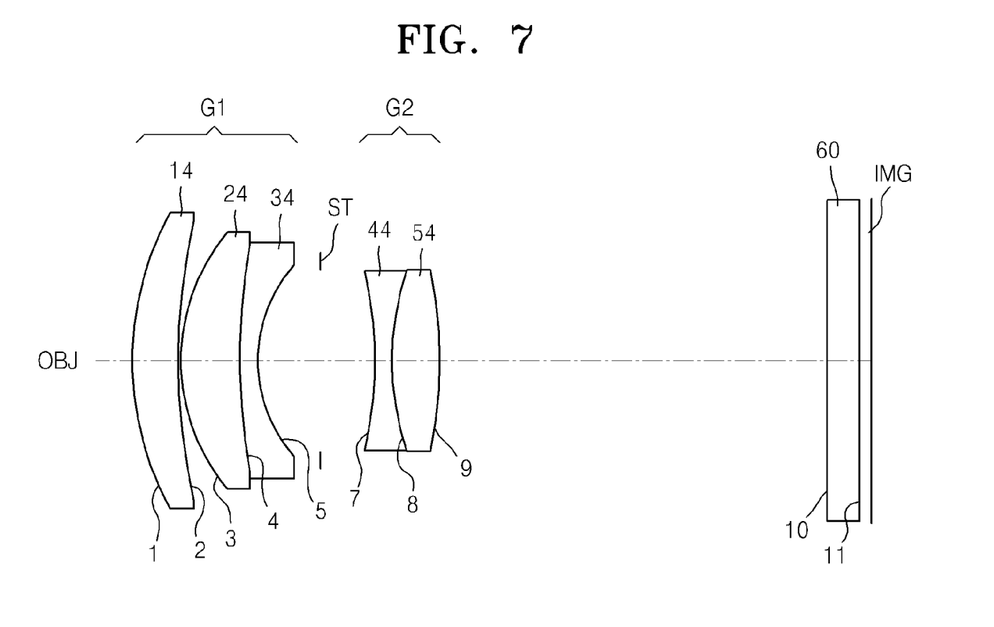
FIG. 7 illustrates an optical arrangement of an imaging lens system according to a fourth embodiment.

FIG. 7 illustrates an optical arrangement of an imaging lens system according to a fourth embodiment. The imaging lens system includes a first lens group G1 having a positive refractive power, an iris ST, and a second lens group G2 having a positive refractive power, which are sequentially arranged from an object OBJ to an image surface IMG. The first lens group G1 includes a first lens 14 which is a positive lens, a second lens 24 which is a positive lens, and a third lens 34 which has a concave surface toward image surface IMG and is a negative lens. The second lens 24 and the third lens 34 form a cemented lens in which the second lens 23 and the third lens 33 are bonded to each other. The second lens group G2 includes a fourth lens 44 which has a concave surface toward the object side OBJ and is a negative lens, and a fifth lens 54 which is a positive lens. The fourth lens 44 and the fifth lens 54 form a cemented lens.

Lens data of the imaging lens system according to the fourth embodiment is as follows:

| f; 69.50 | Fno; 2.85 | 2ω; 23.0° | | |
|---|---|---|---|---|
|  | RDY | THI | nd | υd |
| OBJ: | INFINITY | D0 | | |
| 1: | 25.35000 | 4.210000 | 1.80420 | 46.50 |
| 2: | 56.36000 | 0.150000 | | |
| 3: | 16.80000 | 5.630000 | 1.49700 | 81.61 |
| 4: | 68.53000 | 1.500000 | 1.67270 | 32.17 |
| 5: | 12.63000 | 5.700000 | | |
| ST: | INFINITY | 4.990000 | | |
| 7: | −33.10000 | 1.500000 | 1.51424 | 63.90 |
| ASP: | | | | |

| K | 0.000000 | | |
|---|---|---|---|
| A: | :−.127225E−04 | B: | :0.000000E+00 |
| C: | :0.000000E+00 | D: | :0.000000E+00 |
| 8: | 22.07000 | 4.320000 | 1.64850 | 53.03 |
| 9: | −38.04000 | D1 | | |
| 10: | INFINITY | 2.940000 | 1.51680 | 64.20 |
| 11: | INFINITY | 1.000000 | | |
| IMG: | INFINITY | | | |

|  | Infinity | Nearest |
|---|---|---|
| Photographing magnification | 0 | −0.1X |
| D0 | Infinity | 767.99274 |
| D1 | 37.97594 | 44.92624 |
| fB (In Air) | 40.91423 | 47.86453 |

Figure 8:
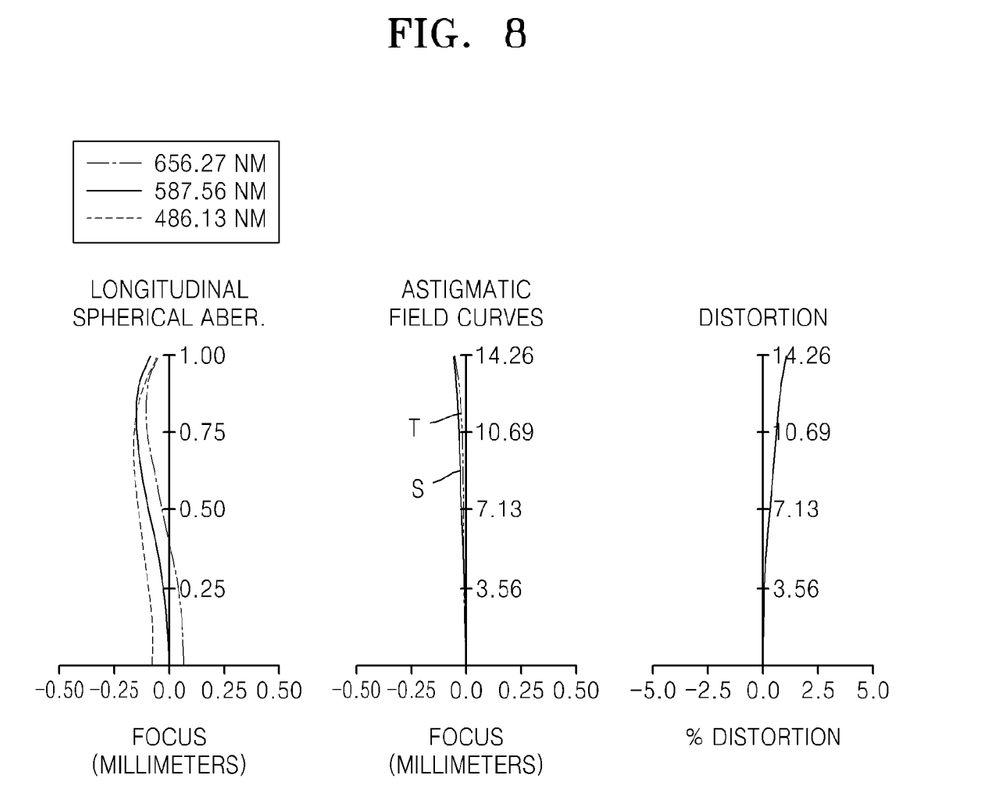
FIG. 8 is an aberration diagram showing the longitudinal spherical aberration, astigmatic field curves, and distortion of the imaging lens system according to the fourth embodiment illustrated in FIG. 7.

FIG. 8 is an aberration diagram showing the longitudinal spherical aberration, astigmatic field curves, and distortion of the imaging lens system according to the fourth embodiment.

The following table shows that the above embodiments satisfy the above-defined conditions.

|  | First embodiment | Second embodiment | Third embodiment | Fourth embodiment |
|---|---|---|---|---|
| Condition 1) | 0.59 | 0.63 | 0.64 | 0.59 |
| Condition 2) | 1.08 | 1.07 | 1.10 | 1.01 |
| Condition 3) | 0.18 | 0.29 | 0.26 | 0.13 |

Regarding the imaging lens systems according to the above embodiments, the number of lenses is minimized, an appropriate back focal length is maintained, and overall uniform-quality optical performance is obtained. The imaging lens systems may be suitable for high-definition image sensing devices. Since focusing is performed by moving the whole imaging lens system, a performance change during focusing is minimized.

The imaging lens system according to the embodiments may be used in various photographing apparatuses including an image sensing device for converting an optical image formed by the imaging lens system into an electrical signal.

While the imaging lens systems according has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. An imaging lens system comprising:
    a first lens group having a positive refractive power, the first lens group including a first lens having a positive refractive power, a second lens having a positive refractive power, and a third lens having a negative refractive power and having a concave surface toward an image surface, which are sequentially arranged from an object to the image surface; and
    a second lens group having a positive refractive power consisting of a cemented lens in which a fourth lens that has a concave surface toward the object side and is a negative lens and a fifth lens that is a positive lens are bonded to each other, the fourth lens and the fifth lens are sequentially arranged from the object side to the image surface, and
    wherein the first lens group and the second group are sequentially arranged from the object side to the image surface.

2. The imaging lens system of claim 1, wherein the imaging lens system satisfies the following condition:

$$0.8 \leq L_T/f \leq 1.3$$

wherein $L_T$ is the distance along the optical axis between the closest lens surface to the object side of the first lens group and the image surface, and f is the focal length of the imaging lens system.

3. The imaging lens system of claim 1, wherein an iris is disposed between the first lens group and the second lens group.

4. The imaging lens system of claim 1, wherein the imaging lens system satisfies the following condition:

$$|n_{d(p)} - n_{d(n)}| \geq 0.1,$$

wherein $n_{d(p)}$ is a refractive index of d-line (587.56 nm) of the positive lens of the second lens group and nd(n) is a refractive index of d-line (587.56 nm) of the negative lens of the second lens group.

5. The imaging lens system of claim 1, wherein the second lens group comprises at least one aspherical surface.

6. The imaging lens system of claim 5, wherein the lens surface of the second lens group which is closest to the object side is an aspherical surface.

7. The imaging lens system of claim 1, wherein the second lens and the third lens form a cemented lens.

8. The imaging lens system of claim 1, wherein when the location of an object is changed from infinity to near position, focusing is performed by moving the whole imaging lens system toward the object.

9. A photographing apparatus comprising: the imaging lens system of claim 1; and
an image sensing device that converts an optical image formed by the imaging lens system into an electrical signal.

10. The imaging lens system of claim 1, wherein the imaging lens system satisfies the following condition:

$$0.2 \leq fB/f \leq 0.7$$

wherein fB is the air distance along an optical axis between a lens surface of the second lens group which is the closest surface to the image surface and the image surface and f is the focal length of the imaging lens system.

11. The imaging lens system of claim 10, wherein the imaging lens system satisfies the following condition:

$$0.8 \leq L_T/f \leq 1.3$$

wherein $L_T$ is the distance along the optical axis between the closest lens surface to the object side of the first lens group and the image surface, and f is the focal length of the imaging lens system.

12. The imaging lens system of claim 10, wherein an iris is disposed between the first lens group and the second lens group.

13. The imaging lens system of claim 10, wherein the imaging lens system satisfies the following condition:

$$|n_{d(p) - nd(n)}| \geq 0.1,$$

wherein nd(p) is a refractive index of d-line (587.56 nm) of the positive lens of the second lens group and nd(n) is a refractive index of d-line (587.56 nm) of the negative lens of the second lens group.

14. The imaging lens system of claim 10, wherein the second lens group comprises at least one aspherical surface.

15. The imaging lens system of claim 14, wherein the lens surface of the second lens group which is closest to the object side is an aspherical surface.

16. The imaging lens system of claim 10, wherein the second lens and the third lens form a cemented lens.

17. The imaging lens system of claim 10, wherein when the location of an object is changed from infinity to near position, focusing is performed by moving the whole imaging lens system toward the object.

18. An imaging lens system consisting of:
a first lens group having a positive refractive power, the first lens group including a first lens having a positive refractive power, a second lens having a positive refractive power, and a third lens having a negative refractive power and having a concave surface toward an image surface, which are sequentially arranged from an object to the image surface; and
a second lens group having a positive refractive power which includes a cemented lens in which a fourth lens that has a concave surface toward the object side and is a negative lens and a fifth lens that is a positive lens are bonded to each other, the fourth lens and the fifth lens are sequentially arranged from the object side to the image surface
wherein the first lens group and the second group are sequentially arranged from the object side to the image surface, and
wherein there are no lenses between the fifth lens and the image surface.

* * * * *